United States Patent
Chung et al.

(10) Patent No.: US 11,431,622 B2
(45) Date of Patent: Aug. 30, 2022

(54) DEVICE AND METHOD FOR INCREASING RELIABILITY OF DOWNLINK TRAFFIC TO MOBILE DEVICES IN RPL ENVIRONMENT

(71) Applicant: Pusan National University Industry-University Cooperation Foundation, Busan (KR)

(72) Inventors: Sanghwa Chung, Busan (KR); Jeongbae Park, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 0 days.

(21) Appl. No.: 17/177,883

(22) Filed: Feb. 17, 2021

(65) Prior Publication Data

US 2022/0210057 A1   Jun. 30, 2022

(30) Foreign Application Priority Data

Dec. 28, 2020   (KR) .......................... 10-2020-0185341

(51) Int. Cl.
*H04L 45/48*   (2022.01)
*H04L 45/12*   (2022.01)
(Continued)

(52) U.S. Cl.
CPC .............. *H04L 45/48* (2013.01); *H04L 45/02* (2013.01); *H04L 45/08* (2013.01); *H04L 45/12* (2013.01); *H04L 45/14* (2013.01); *H04L 45/26* (2013.01)

(58) Field of Classification Search
CPC ......... H04L 45/48; H04L 45/02; H04L 45/08; H04L 45/12; H04L 45/14; H04L 45/24; H04L 45/26
See application file for complete search history.

(56) References Cited

U.S. PATENT DOCUMENTS

2011/0228696 A1*   9/2011   Agarwal ................. H04L 45/02
                                                                370/255
2011/0228788 A1*   9/2011   Thubert .................. H04L 45/02
                                                                370/400
(Continued)

FOREIGN PATENT DOCUMENTS

KR          10-1208400 B1   12/2012
KR          10-1678954 B1   11/2016
KR       10-2020-0004580 A   1/2020

*Primary Examiner* — Mohamed A Kamara
(74) *Attorney, Agent, or Firm* — Paratus Law Group, PLLC

(57) ABSTRACT

Disclosed is a device for increasing reliability of downlink traffic to mobility devices in an RPL environment that can increase reliability of downlink traffic by dual path generation and redundant packet retransmission for the mobile device in an environment where mobility exists. The moving device includes a directed acyclic graph (DAG) rank value acquisition unit for receiving a destination oriented directed acyclic graph information object (DIO) of parent devices to obtain a DAG rank value of each parent device; a parent device selection unit for selecting prefer parents and alternate parents based on a DAG rank of the parent device; and a destination advertisement object (DAO) signal processing unit for transmitting a DAO to a sync device when the prefer parents and the alternate parents are determined.

11 Claims, 15 Drawing Sheets

(51) Int. Cl.
*H04L 45/02* (2022.01)
*H04L 45/00* (2022.01)

(56) References Cited

U.S. PATENT DOCUMENTS

2015/0327261 A1* 11/2015 Thubert .............. H04W 74/085
 370/336
2016/0262081 A1*  9/2016 Guo ...................... H04W 40/12
2021/0320809 A1* 10/2021 Thubert ................. H04L 45/48

* cited by examiner

DEVICE AND METHOD FOR INCREASING RELIABILITY OF DOWNLINK TRAFFIC TO MOBILE DEVICES IN RPL ENVIRONMENT

This research was supported by the Ministry of Science and ICT, Republic of Korea (MSIT), under a Grand Information Technology Research Center support program (IITP-2021-2016-0-00318) supervised by an Institute for Information & communications Technology Planning & Evaluation (IITP).

CROSS-REFERENCE TO RELATED APPLICATION

This application claims priority to Korean Patent Application No. 10-2020-0185341 (filed on Dec. 28, 2020), which is hereby incorporated by reference in its entirety.

BACKGROUND

The present disclosure relates to RPL routing technology in an industrial wireless network, and more particularly, to a device and method for increasing reliability of downlink traffic to mobility devices in a routing protocol for low-power and lossy network (RPL) environment that can increase reliability of downlink traffic by dual path generation and redundant packet retransmission for the mobile device in an environment where mobility exists.

The Internet Engineering Task Force (IETF) ROLL Working Group proposed RPL, which is a standard routing protocol for low power wireless networks based on IPv6 to transfer data between multiple IoT devices.

The protocol forms a tree-based Destination Oriented Directed Acyclic Graph (DODAG), performs routing, and was designed to be appropriate for low-power and very noisy network environments such as IEEE 802.15.4 and power line communication.

A network routing path constructs a network path by a set objective function (OF), and may use a separate OF for QoS of each network.

An RPL protocol configures a topology using a DODAG information object (DIO), a destination advertisement object (DAO), and DODAG information solicitation (DIS), which are control messages.

Devices in the DODAG periodically broadcast DIO messages to notify network information thereof and induce other devices to participate in a network.

The device, having received the DIO calculates a DAG rank value using an OF based on DIO information of a neighboring device, and selects an optimal parent device to participate in the network.

The DAO message is used for generating a path to a sync device and notifying downlink traffic information.

The DIS message is a message for requesting a DIO message. The DIS message may be used when the device wants to participate in the network or needs to update the path, and DIO transmission from the neighboring device may be requested through the DIS message.

RPL provides an excellent performance in a low power and lossy network (LLN) environment, but because the RPL was designed without consideration for a mobile device, a method for the mobile device is required.

In RPL, when a mobile device performs a routing device, the mobile device may confuse a network due to mobility. Therefore, the mobile device cannot perform the role of a router device, and may act only as a terminal device.

After moving, the mobile terminal device determines a new parent device using DAG Rank values of neighboring devices and forwards a packet to the corresponding device.

However, because downlink traffic is transmitted from a sync device to a mobile terminal device through source routing, when routing information through a DAO is not updated, existing routing information may become invalid.

FIG. 1 is a diagram illustrating a packet loss and path recovery scenario due to a movement of a mobile device.

Invalid routing information causes unnecessary retransmission to shorten the life of a network and to affect traffic reliability degradation due to a packet loss.

Accordingly, there is a need to develop new RPL routing technology for increasing reliability of downlink traffic to mobile devices in an IPv6 Routing Protocol Low Power and Lossy Networks (RPL) environment, which is standard technology used in industrial wireless networks.

PRIOR ART DOCUMENT

Patent Document (Patent Document 1) Korean Patent Application Laid-open No. 10-2020-0004580
(Patent Document 2) Korean Patent Registration No. 10-1208400
(Patent Document 3) Korean Patent Registration No. 10-1678954

SUMMARY

The present disclosure has been made in an effort to solve the problem of RPL routing technology in an industrial wireless network of the prior art, and provides a device and method for increasing reliability of downlink traffic to mobile devices in an RPL environment that can increase reliability of downlink traffic by dual path generation and redundant packet retransmission for a mobile device in an environment where mobility exists.

The present disclosure provides a device and method for increasing reliability of downlink traffic to mobile devices in an RPL environment in which packets can be transmitted through the remaining paths, even if one path is not valid due to a parent change of the mobile device by dual path generation and redundant packet retransmission for the mobile device.

The present disclosure provides a device and method for increasing reliability of downlink traffic to mobility devices in an RPL environment that can minimize shortening of a network life by minimizing a dual path using a common ancestor device selection method when retransmitting redundant packets through a dual path.

The present disclosure provides a device and method for increasing reliability of downlink traffic to mobile devices in an RPL environment that can reduce energy consumption of a low-power communication device that consumes a lot of energy in transmission/reception by enabling an RPE cancellation packet to prevent unnecessary retransmission due to network quality degradation of one path through a reverse packet removal method.

Other objects of the present disclosure are not limited to the above-mentioned objects, and other objects not mentioned will be clearly understood by those skilled in the art from the following description.

According to embodiments of the present disclosure, a device for increasing reliability of downlink traffic to a mobile device in an RPL environment, wherein the moving device includes a DAG rank value acquisition unit for receiving a DIO of parent devices to obtain a DAG rank value of each parent device, a parent device selection unit for selecting prefer parents and alternate parents based on a DAG rank of the parent device, and a DAO signal processing unit for transmitting a DAO to the sync device when the prefer parents and the alternate parents are determined, wherein a stationary device that becomes the parent device includes a DAO signal receiving unit for enabling to obtain a common ancestor device qualification when receiving the DAO signal from the mobile device, and receiving the same pair of PDAO and ADAO, a DAO change transmission unit for obtaining a common ancestor device qualification and preventing further acquisition of a common ancestral device qualification, and a dual path setting notification unit for transmitting common ancient configuration complete (CCC) to the mobile device to stop attempting to generate a dual path.

The parent device selection unit may select parents with a lowest DAG rank as prefer parents and parents with a second lowest DAG rank as alternate parents based on the DAG rank of the parent device.

The DAO signal processing unit may transmit prefer parents DAO (PDAO) to prefer parents and alternate parents DAO (ADAO) to alternate parents.

The DAO change transmission unit may obtain a common ancestor device qualification, changes a later coming PDAO or ADAO to an existing DAO, and transmit the existing DAO to the sync device to prevent further acquisition of a common ancestor device qualification.

According to embodiments of the present disclosure, a method for increasing reliability of downlink traffic to a mobile device in an RPL environment includes receiving, by the mobile device, a DIO of parent devices and obtaining a DAG rank of each parent device; selecting parents with a lowest DAG rank as prefer parents and parents with a second lowest DAG rank as alternate parents based on a DAG rank of the parent device; transmitting, by a mobile device that determines prefer parents and alternate parents, a DAO to a sync device to transmit a prefer parents DAO (PDAO) to the prefer parents and an alternate parents DAO (ADAO) to the alternate parents; storing, by parent devices that have received the PDAO or ADAO, information, then continuing to transmit the information to the sync device, and obtaining a common ancestor device qualification by receiving the same pair; and obtaining the common ancestral device qualification, changing a later coming PDAO or ADAO to an existing DAO, and transmitting the existing DAO to the sync device to prevent further acquisition of a common ancestor device qualification.

The DAO message may set a PDAO or ADAO by adding a dual path option, and express the same pair through the sequence number.

DIO reception of the mobile device may include obtaining a DAG rank value of a neighboring node and determining whether there are prefer parents; determining, if there are prefer parents, whether there are alternate parents, and transmitting, if there is no alternate parents, a PDAO to the prefer parents and transmitting an ADAO to candidate alternate parents; determining, if there are alternate parents, whether a change of the alternate parents is necessary, transmitting, if a change of the alternate parents is necessary, a PDAO to the prefer parents and transmitting an ADAO to candidate alternate parents; determining, if a change of the alternate parents is unnecessary, whether a change of the prefer parents is necessary, transmitting, if a change of the prefer parents is necessary, a PDAO to candidate prefer parents, and transmitting an ADAO to candidate alternate parents; and retransmitting CCC when CCC is not received for some time after PDAO transmission and ADAO transmission.

PDAO and ADAO reception of a common ancestor device or a sync device may include determining, when a DAO is received, whether the DAO is a PDAO or ADAO, changing, if the DAO is not a PDAO or ADAO, the PDAO or ADAO to an existing DAO, and transmitting the existing DAO to the sync device; determining, if the DAO is not ADAO, whether there is an ADAO, and determining, if there is an ADAO, whether the DAO is PDAO transmitted from the same mobile device; determining, if the DAO is a PDAO transmitted from the same mobile device, whether the ADAO and the PDAO are the same pair, disqualifying, if the ADAO and the PDAO are not the same pair, a qualification of a common ancestor device, and storing the PDAO; and obtaining, if the ADAO and the PDAO are the same pair, a common ancestor qualification, storing the PDAO, transmitting CCC, and changing the PDAO to the DAO.

Determining whether the DAO is a PDAO or an ADAO, and if the DAO is an ADAO may include determining whether there is a PDAO, determining, if there is a PDAO, whether the DAO is an ADAO transmitted from the same mobile device; determining, if the DAO is an ADAO transmitted from the same mobile device, whether the ADAO and the PDAO are the same pair; disqualifying, if the ADAO and the PDAO are not the same pair, a common ancestor device qualification, storing the ADAO, and transmitting the ADAO or the DAO to the sync device; and obtaining, if the ADAO and the PDAO are the same pair, a common ancestral device qualification, storing the ADAO, transmitting CCC, and changing the ADAO to the DAO.

A packet exchange procedure between the mobile devices and the common ancestor device may include essentially passing, by the packet transmitted from the sync device to the mobile device, through the common ancestor device, copying, by the common ancestor device, the packet, and transmitting, the original packet to a prefer parent path; transmitting, if an RPE cancellation packet is not received from the mobile device within a specified delay time, a copy packet to an alternate parent device path; transmitting, when the packet is received, by the mobile device, the RPE cancellation packet to the common ancestor device using a path other than a path received the packet; and determining, by the device that has received the RPE cancellation packet, whether there is a copy packet or an original packet corresponding to the RPE cancellation packet, deleting, if there is a copy packet or an original packet corresponding to the RPE cancellation packet, the packet, and preventing further transmission of the RPE cancellation packet.

If there is no copy packet or original packet, the RPE cancellation packet may arrive at the common ancestor device, and when the RPE cancellation packet is transmitted to the common ancestor device, a non-transmitted copy packet in the common ancestor device may be deleted because the copy packet was not transmitted due to a delay time.

Advantageous Effects

As described above, a device and method for increasing reliability of downlink traffic to mobile devices in an RPL environment according to the present disclosure have the following effects.

First, in an RPL-based network environment, it is possible to increase reliability of downlink traffic through dual path generation and redundant packet retransmission to a mobile device.

Second, it is possible to increase a network operation time by reducing unnecessary retransmission through a reverse packet removal method.

Third, it is possible to minimize a double path through a method of selecting a common ancestor device. The minimized dual path increases a network operation time.

DETAILED DESCRIPTION

Hereinafter, a preferred embodiment of a device and method for increasing reliability of downlink traffic to mobile devices in an RPL environment according to the present disclosure will be described in detail as follows.

Features and advantages of a device and method for increasing reliability of downlink traffic to mobile devices in an RPL environment according to the present disclosure will become apparent through a detailed description of each embodiment below.

Figure 1:
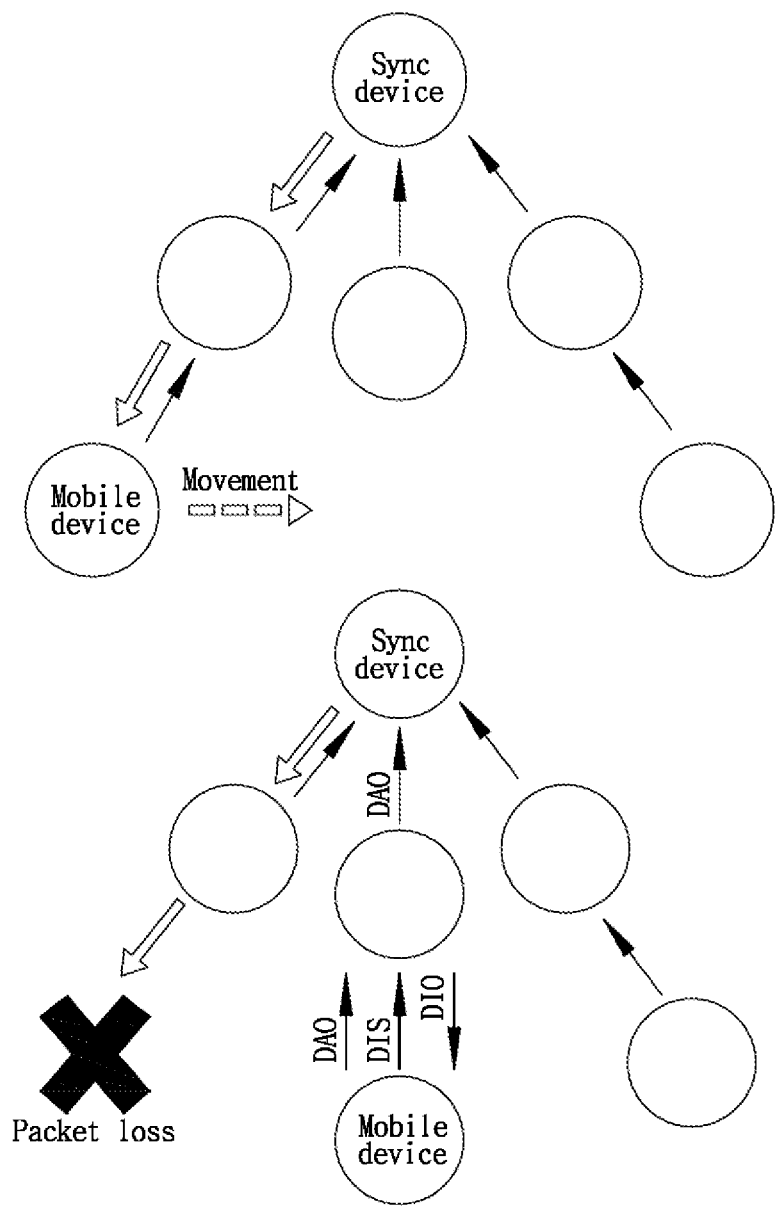
FIG. 1 is a diagram illustrating a packet loss and path recovery scenario due to a movement of a mobile device.
Figure 2:
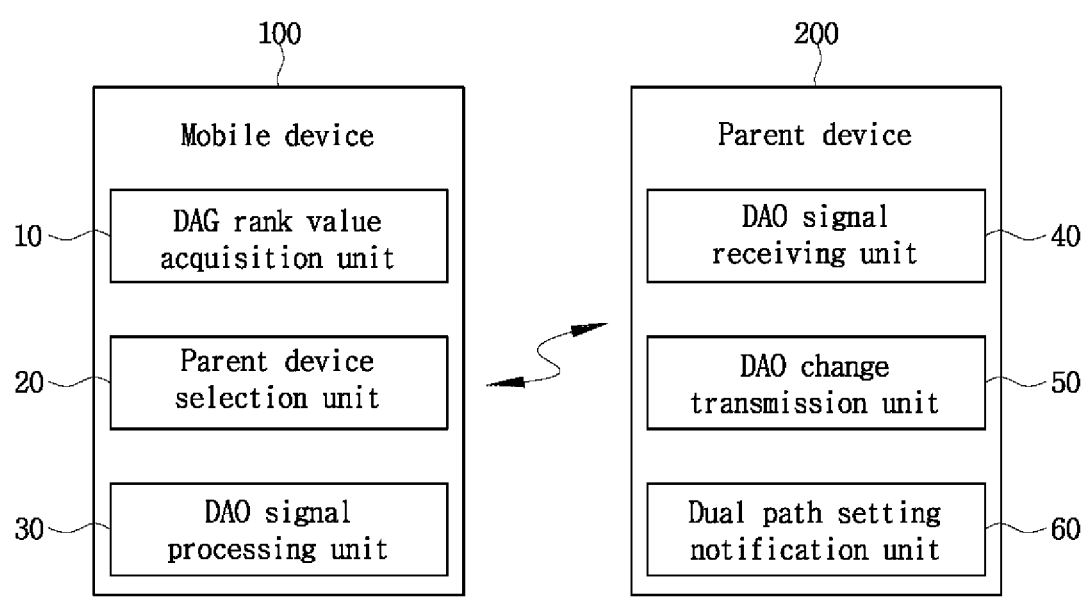
FIG. 2 is a block diagram of a device for increasing reliability of downlink traffic to mobile devices in an RPL environment according to the present disclosure.

FIG. 2 is a block diagram of a device for increasing reliability of downlink traffic to mobile devices in an RPL environment according to the present disclosure.

A device and method for increasing reliability of downlink traffic to mobile devices in an RPL environment according to the present disclosure increase reliability of downlink traffic by dual path generation and redundant packet retransmission for a mobile device in an environment where mobility exists.

To this end, the present disclosure may include a configuration in which a packet can be transmitted through the remaining paths, even though one path is not valid due to a parent change of a mobile device by dual path generation and redundant packet retransmission for the mobile device.

The present disclosure may include a configuration of minimizing dual paths by using a common ancestor device selection method when retransmitting redundant packets through a dual path.

The present disclosure may include a configuration in which an RPE cancellation packet prevents unnecessary retransmission due to network quality decline of one path through a reverse packet removal method.

A downlink traffic path to the mobile device is updated when the sync device receives a DAO of the mobile device. A movement of the mobile device causes a change of the parent device and changes a routing path.

Until the sync device receives a DAO from the mobile device, a wrong downlink routing path to the mobile device is not corrected. An incorrect downlink routing path causes unnecessary transmission of routing devices in the network, resulting in shortening of a network life. In particular, in the case of an application for controlling the mobile device, a lot of traffic for control occurs, and an incorrect downlink routing path has a fatal effect on a life and traffic reliability of the network.

In the case of dual path generation and redundant packet retransmission for the mobile device, even if one path is not valid due to a parent change of the mobile device, a packet can be transmitted through the remaining paths.

Redundant packet retransmission through a dual path increases the number of times of transmission and reception of a routing device, thereby increasing energy consumption of the device. The reduction of network life is minimized by minimizing dual paths by using a common ancestor device selection method. The reverse packet removal method is to remove redundant packets using RPE cancellation packets when maintaining two completely independent paths.

In particular, because the RPE cancellation packet can prevent unnecessary retransmissions due to degradation of a network quality of one path, energy consumption of a low-power communication device that consumes a lot of energy in transmission and reception can be reduced.

The device for increasing reliability of downlink traffic to the mobile device in an RPL environment according to the present disclosure includes a DAG rank value acquisition unit 10 in which the mobile device 100 receives a DIO of parent devices to obtain a DAG rank value of each parent device, as illustrated in FIG. 2, a parent device selection unit 20 for selecting parents having a lowest DAG rank as prefer parents, and parents having a second lowest DAG rank as alternate parents based on a DAG rank of the parent device, and a DAO signal processing unit 30 for transmitting a DAO to the sync device and transmitting a prefer parents DAO (PDAO) to the prefer parents and an alternate parents DAO (ADAO) to the alternate parents, when prefer parents and alternate parents are determined.

A parent device 200 includes a DAO signal receiving unit 40 for receiving a DAO signal from the mobile device 100 and obtaining a common ancestor device qualification when receiving the same pair of PDAO and ADAO, a DAO change transmission unit 50 for obtaining a common ancestral device qualification and changing a later coming PDAO or ADAO to an existing DAO and transmitting the existing DAO to the sync device to prevent further acquisition of a common ancestral device qualification, and a dual path setting notification unit 60 for transmitting common ancient configuration complete (CCC) to the mobile device and notifying that dual path setting has been completed to enable the mobile device, having received the CCC to stop attempting to generate a dual path.

A device for increasing reliability of downlink traffic to mobile devices in an RPL environment according to the present disclosure can reduce a packet loss by generating dual paths and retransmitting redundant packets, and continue to transmit data while changing a routing path of the mobile device.

However, because energy consumption of a routing device may increase, the present disclosure reduces unnecessary retransmissions using a reverse packet removal method, thereby reducing energy consumption.

Figure 3A:
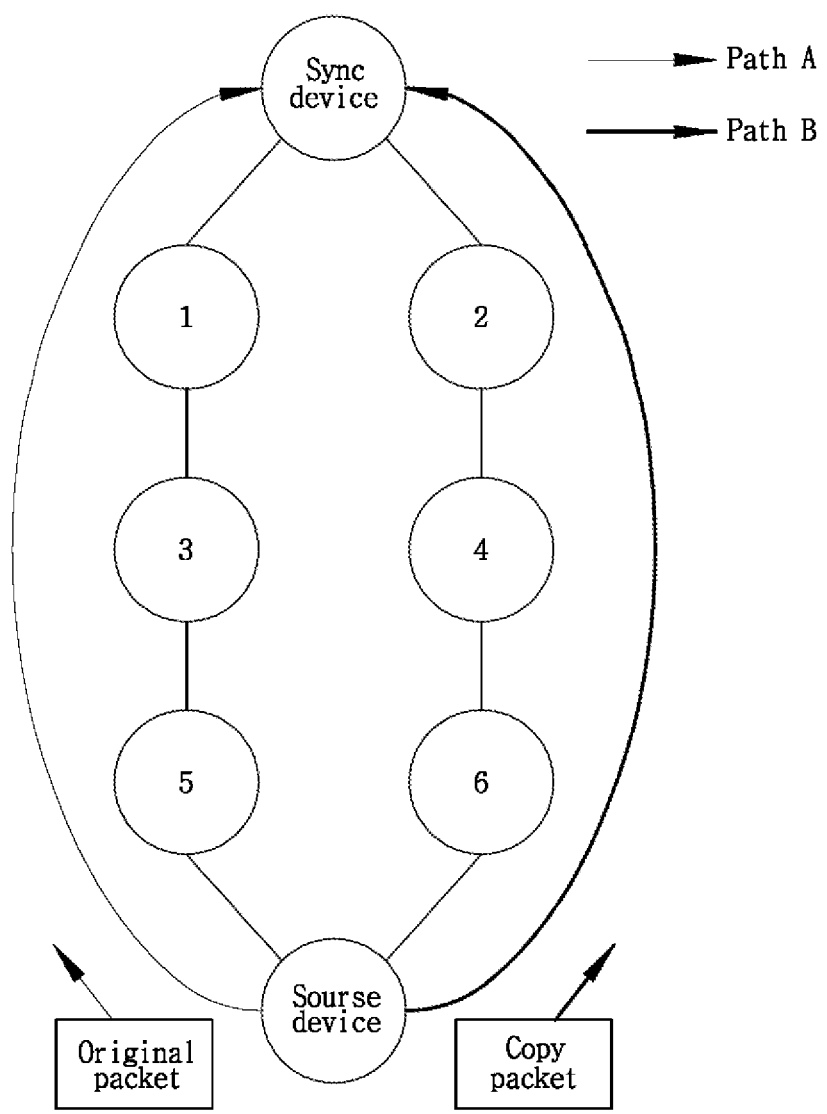
FIGS. 3A to 3C are diagrams illustrating a network topology for use of reverse packet removal.
Figure 3B:
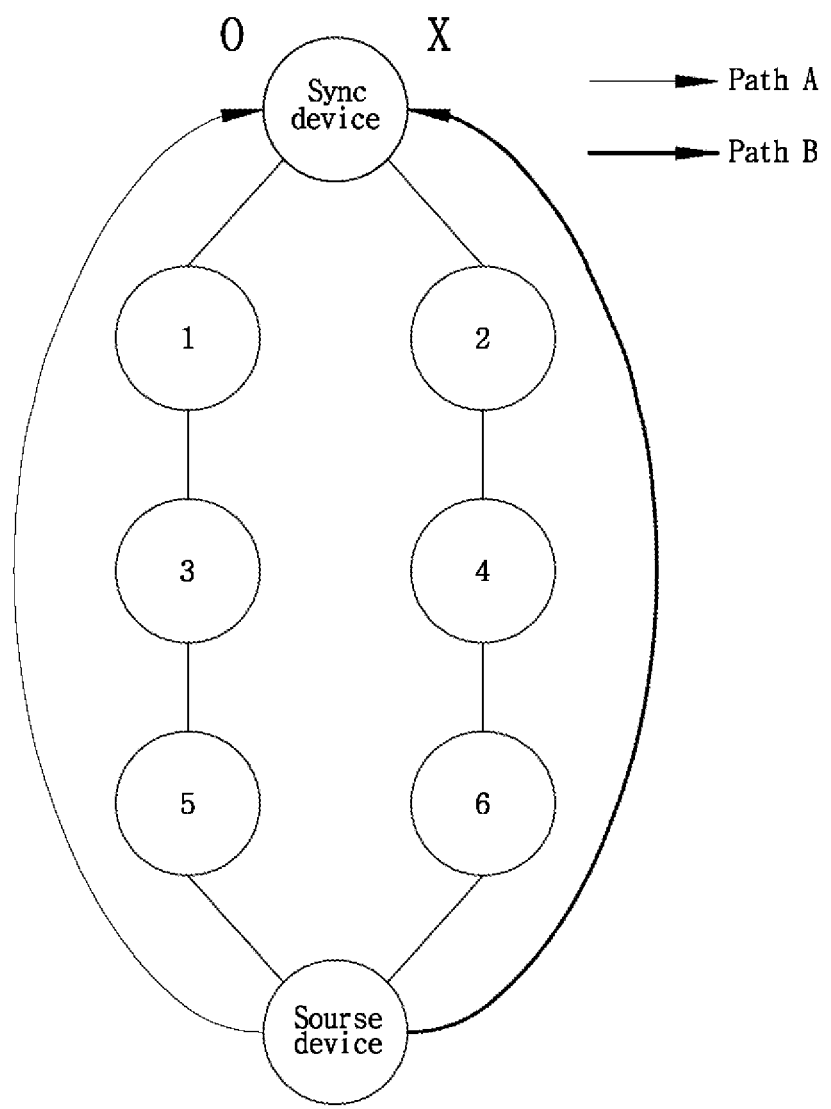
Figure 3C:
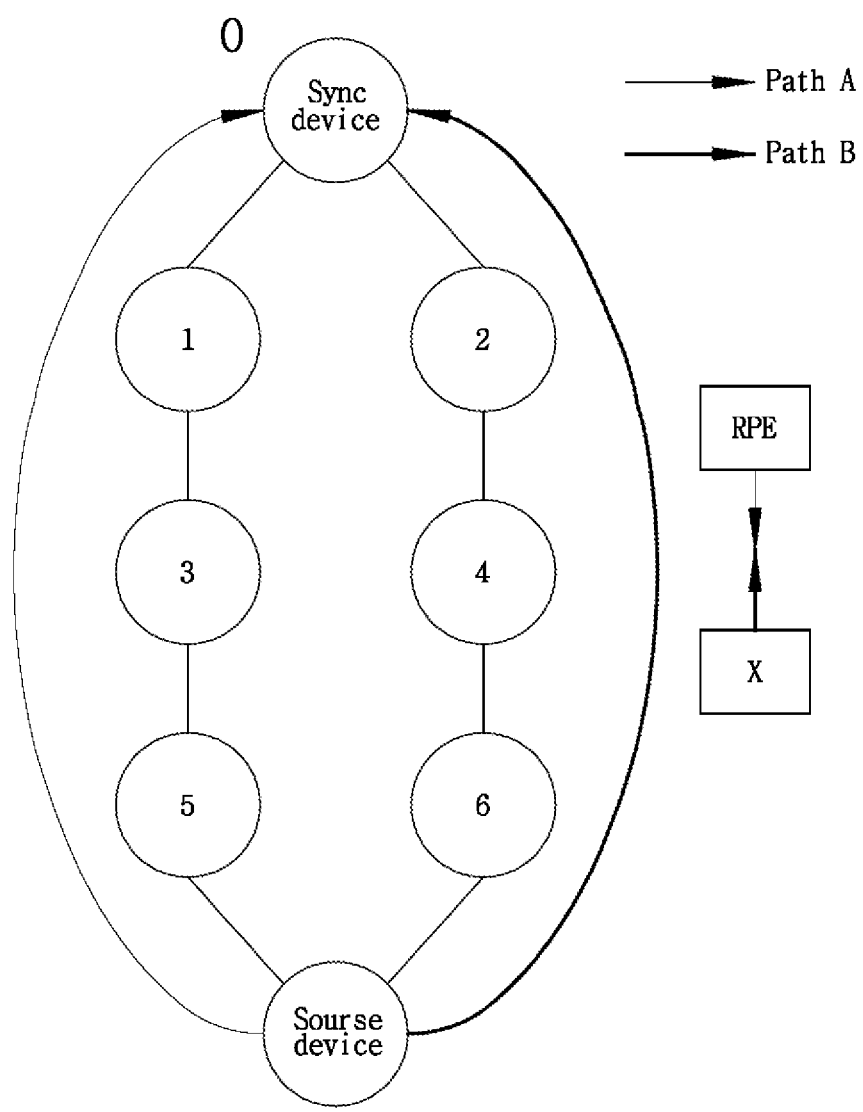

FIGS. 3A to 3C are diagrams illustrating a network topology for use of reverse packet removal.

A reverse packet removal method is a method of increasing reliability of traffic by transmitting redundant packets in two completely independent paths and increasing a network life by using RPE cancellation packets.

FIG. 3A illustrates a network topology for use of reverse packet removal.

After transmitting an original packet, the source device transmits a duplicated packet to a sync device using a completely independent path after a delay time. The delay time may vary depending on network stability requirements. When receiving the packet, the sync device transmits an RPE cancellation packet through a path other than a reception path. The device, having receiving the RPE cancellation packet determines whether there are redundant packets, and if there are redundant packets, the device removes the redundant packets. If redundant packets are deleted, the RPE cancellation packet is no longer transmitted.

As illustrated in FIG. 3B, when the sync device receives a packet from another path before transmitting the RPE cancellation packet, the sync device does not transmit the RPE cancellation packet and deletes a late coming packet.

As illustrated in FIG. 3C, when the device, having received the RPE cancellation packet has redundant packets or original packets, the device the RPE cancellation packet deletes redundant packets or original packets and then shows that the RPE cancellation packet is no longer transmitted.

The REP cancellation packet has a size of 23 bytes and has a minimum packet size of an 802.15.4 frame including the required header and 2 bytes of RPE cancellation packet payload. A bit error incidence rate varies according to a wireless network environment, and when a bit error occurs, packets are deleted.

A packet error incidence rate is represented with Equation 1.

$$PER = 1-(1-P_b)^{nbits} \quad \text{[Equation 1]}$$

PER is a packet error incidence rate, and $P_b$ is a bit error incidence rate.

Because a packet reception rate PRR is a probability that no packet error occurs, PRR=1−PER. In an environment with the same bit error incidence rate, the ratio of a reception rate $PRR_L$ of along packet and a reception rate $PRR_s$ of a short packet is represent with Equation 2.

$$PRR_s = 1 - PRR_l^{\frac{Ls}{Ll}} \quad \text{[Equation 2]}$$

$L_l$ is the number of bits of a long packet, and $L_s$ is the number of bits of a short packet.

Equation 2 illustrates the importance of a packet length in terms of the packet reception rate.

The RPE cancellation packet includes fewer bits than those of long packets generated by the application, and when a packet reception rate of 127 bytes is 70% in an environment with the same error rate, an RPE cancellation packet of 23 bytes has a packet reception rate of 93.7%.

That is, even in the same network environment, a shorter RPE cancellation packet has a higher packet reception rate than that of a longer data packet.

The high packet reception rate can contribute to an increase in a network life by preventing retransmission due to a packet transmission failure. Further, because the packet length is short, a short transmission time is required, thereby reducing energy consumption.

A detailed description of a network participation method of a mobile device according to the present disclosure is as follows.

Figure 4:
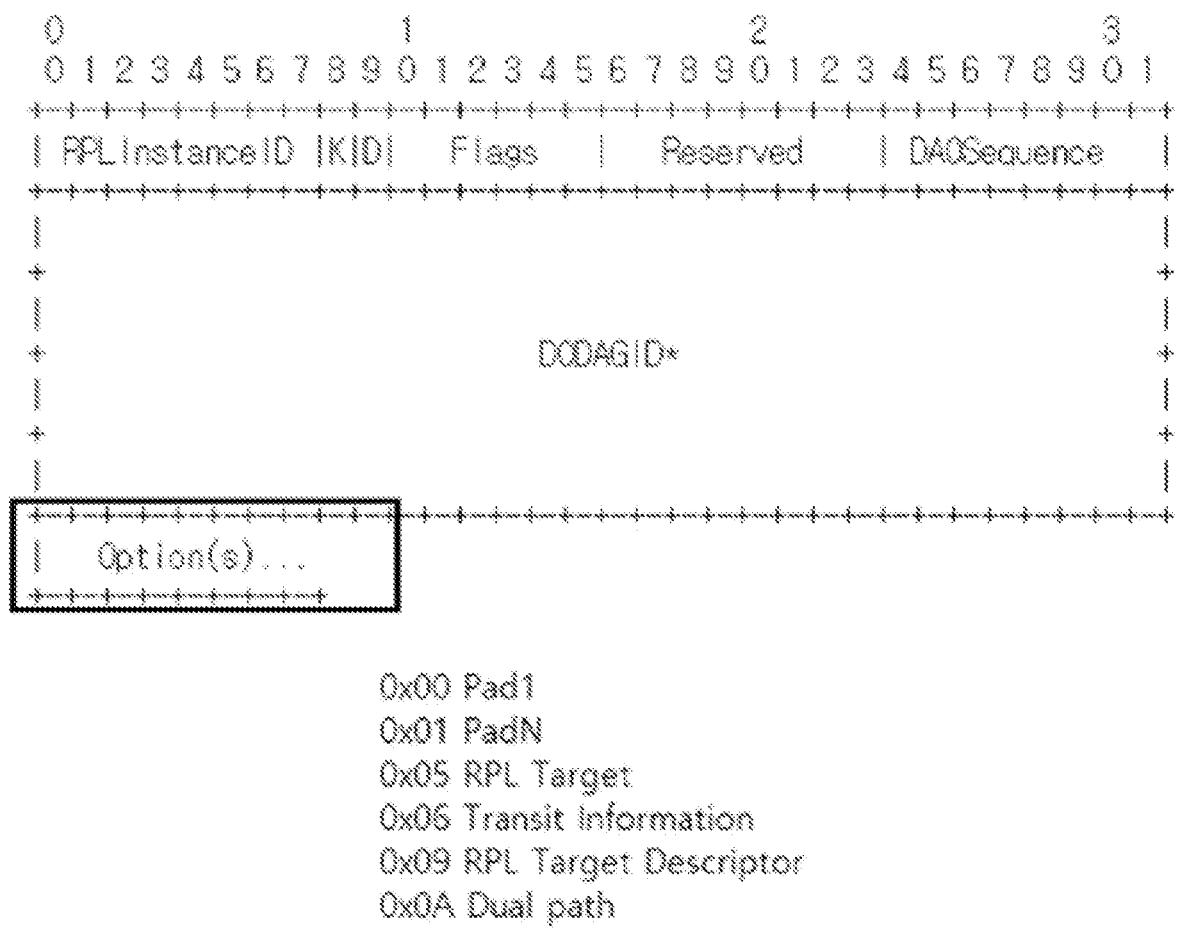
FIG. 4 is a diagram illustrating a DAO control message and a DAO message option in RFC 6550.

FIG. 4 is a diagram illustrating a DAO control message and a DAO message option in RFC 6550.

The mobile device may receive a DIO of parent devices to know a DAG rank of each parent device.

The mobile device selects parents with a lowest DAG rank as prefer parents and parents with a second lowest DAG rank as alternate parents based on a DAG rank of the parent device.

The mobile device that has determined prefer parents and alternate parents sends a DAO to the sync device. In this case, the mobile device transmits a prefer parents DAO (PDAO) to prefer parents, and transmits an alternate parents DAO (ADAO) to alternate parents.

FIG. 4 is a diagram illustrating a DAO control message and a DAO message option in RFC 6550.

DAO messages may transfer valid options, and by adding a dual path option, a PDAO or an ADAO may be set, and the same pair may be expressed through the sequence number.

The parent devices, having received the PDAO or ADAO store information and then continue to transfer the information to the sync device. The parent devices, having received the same pair obtain a common ancestor device qualification.

Figure 5:
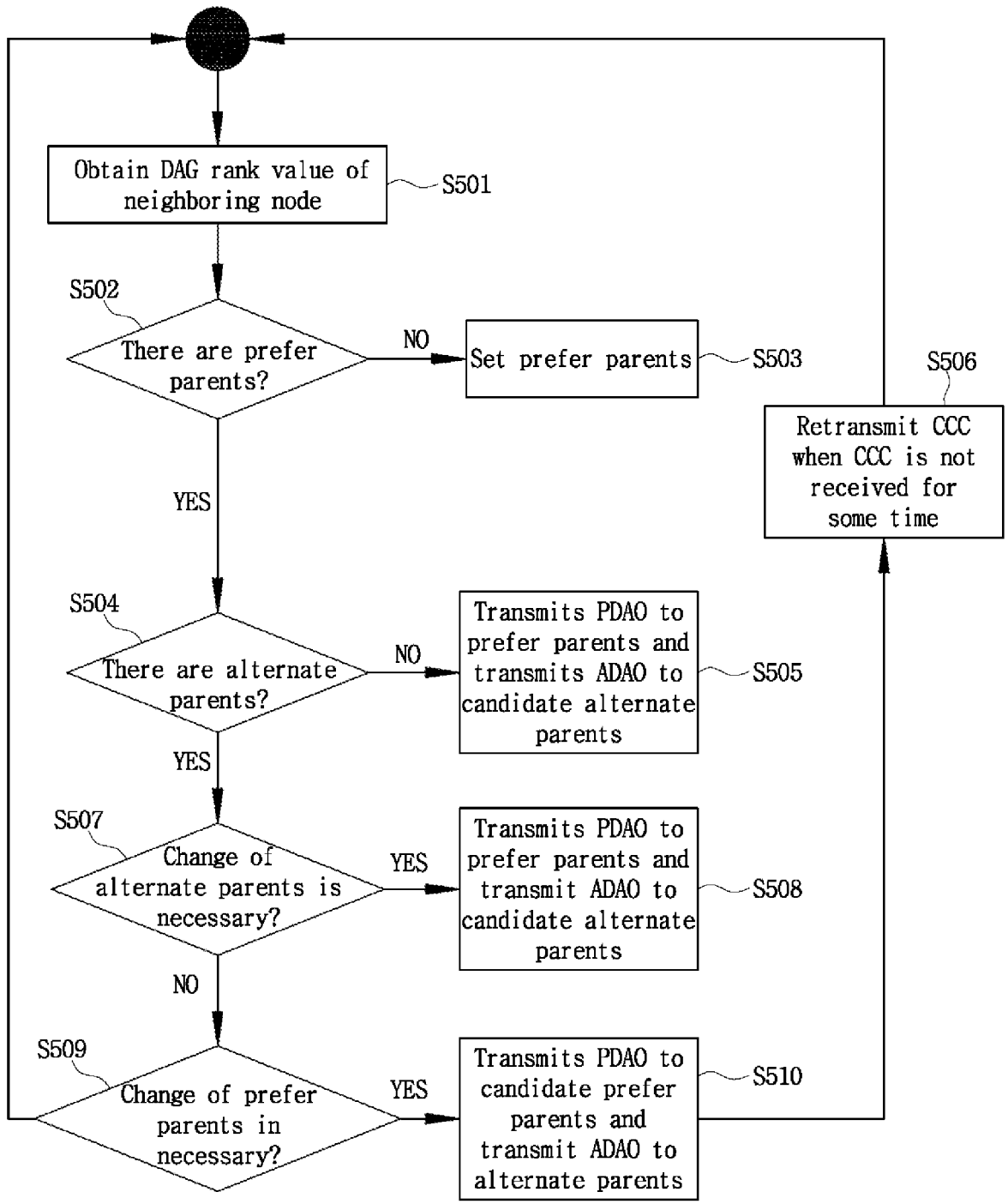
FIG. 5 is a flowchart illustrating a procedure when a mobile device receives a DIO.

FIG. 5 is a flowchart illustrating a procedure when a mobile device receives a DIO.

When the mobile device receives a DIO, the mobile device obtains a DAG rank value of a neighboring node (S501), and determines whether there are prefer parents (S502).

If there is no prefer parents, the mobile device performs again prefer parent setting step (S503), and if there are prefer parents, the mobile device determines whether there are alternate parents (S504).

If there is no alternate parents, the mobile device transmits a PDAO to the prefer parent, and transmits an ADAO to candidate alternate parents (S505). If there are alternate parents, the mobile device determines whether a change of the alternate parents is necessary (S507).

If a change of the alternate parents is necessary, the mobile device transmits a PDAO to the prefer parents and transmits an ADAO to the candidate alternate parents (S508).

If a change of the alternate parents is unnecessary, the mobile device determines whether a change of the prefer parents is necessary (S509). If a change of the prefer parents is necessary, the mobile device transmits a PDAO to the candidate prefer parents, and transmits an ADAO to the candidate alternate parents (S510).

After PDAO transmission and ADAO transmission, the mobile device retransmits CCC when CCC is not received for some time (S506).

A detailed description of acquisition of a common ancestral device qualification of the stationary device is as follows.

Figure 6A:
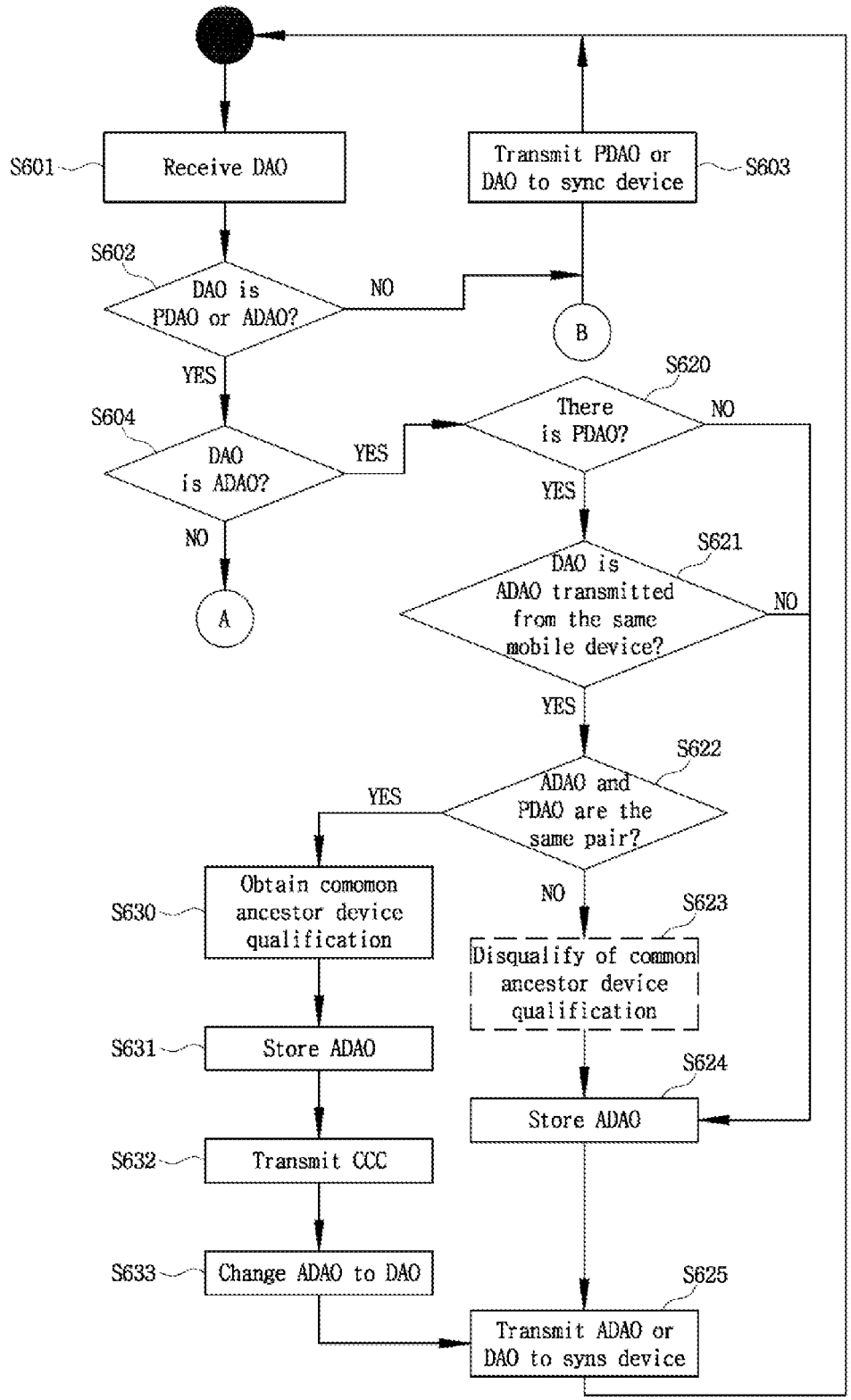
FIGS. 6A and 6B are flowchart illustrating a procedure when a common ancestral device or a stationary device receives a PDAO or ADAO.
Figure 6B:
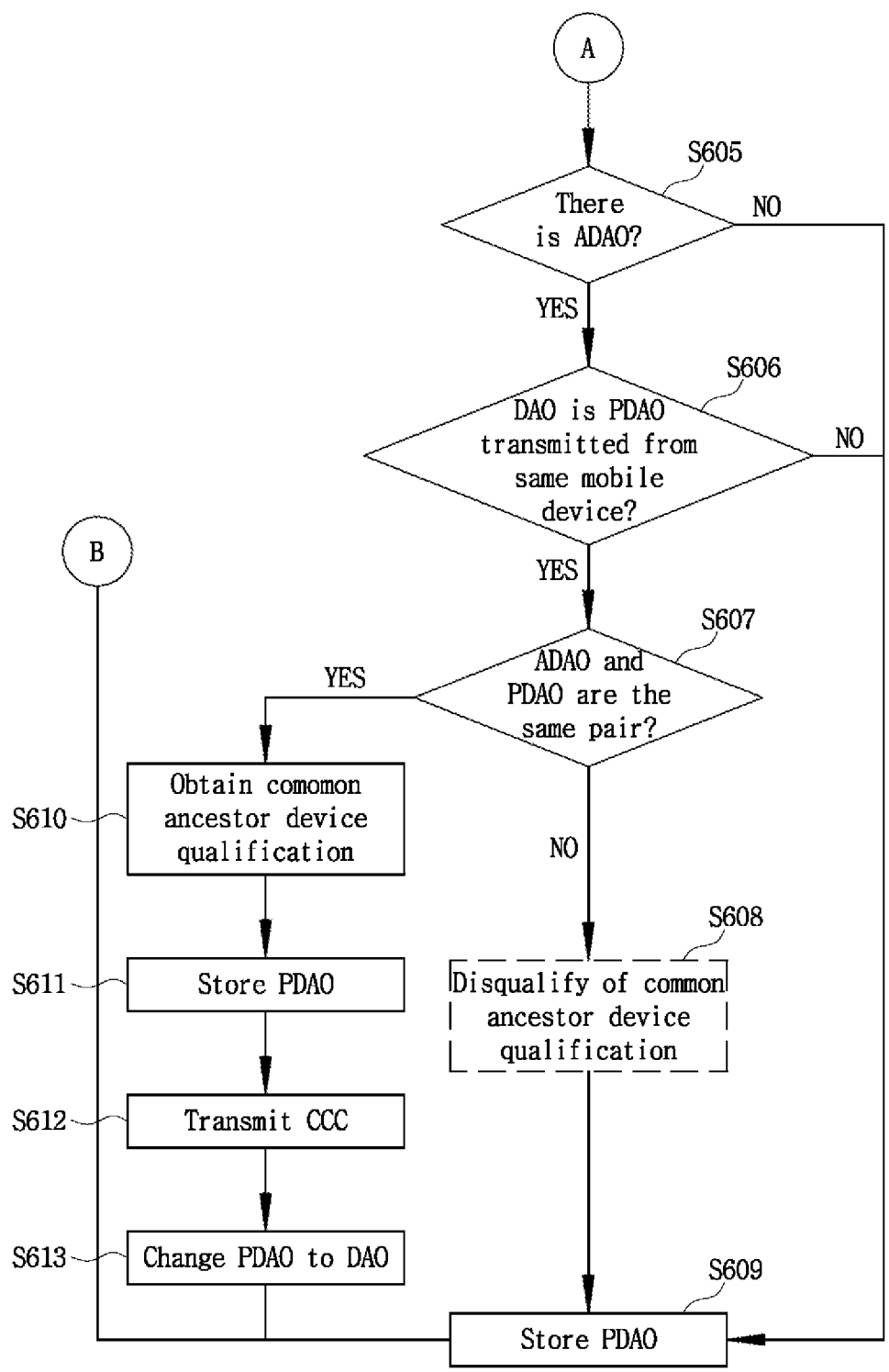

FIGS. 6A and 6B are flowchart illustrating a procedure when a common ancestral device or a stationary device receives a PDAO or ADAO.

First, when a DAO is received (S601), the device determines whether the DAO is a PDAO or ADAO (S602). If the DAO is no PDAO or ADAO, the device changes the PDAO or ADAO to an existing DAO and transmits the existing DAO to the sync device (S603).

If the DAO is an ADAO (S604), the device determines whether there is a PDAO (S620), and if there is a PDAO, the device determines whether the DAO is an ADAO transmitted from the same mobile device (S621).

If the DAO is an ADAO transmitted from the same mobile device, the device determines whether the ADAO and the PDAO are the same pair (S622). If the ADAO and the PDAO are not the same pair, the device disqualifies a qualification of the common ancestor device (S623), stores the ADAO (S624), and transmits the ADAO or the DAO to the sync device (S625)

If the ADAO and PDAO are the same pair, the device obtains a qualification of a common ancestor device (S630), stores the ADAO (S631), transmits CCC (S632), and changes the ADAO to the DAO (S633).

If the DAO is no ADAO (S604), the device determines whether there is an ADAO (S605), and if there is an ADAO, the device determines whether the DAO is a PDAO transmitted from the same mobile device (S606).

If the DAO is a PDAO transmitted from the same mobile device, the device determines whether the ADAO and the PDAO are the same pair (S607), if the ADAO and the PDAO are not the same pair, the device disqualifies a qualification of a common ancestor device (S608), and stores the PDAO (S609).

If the ADAO and PDAO are the same pair, the device obtains a qualification of a common ancestor device (S610), stores the PDAO (S611), transmits CCC (S612), and changes the PDAO to the DAO (S613).

In this way, when the stationary device receives the same pair of PDAO and ADAO from the mobile device, the stationary device may obtain a common ancestor device qualification.

The stationary device, having obtained the common ancestor device qualification changes a later coming PDAO or ADAO to an existing DAO and transmits the existing DAO to the sync device, thereby preventing further acquisition of the common ancestor device qualification.

The stationary device transmits common ancient configuration complete (CCC) to the mobile device to notify completion of the dual path setting. The mobile device, having received the CCC stops attempting to generate a dual path.

The packet exchange between the mobile device and the common ancestor device will be described in detail as follows.

Figure 7:
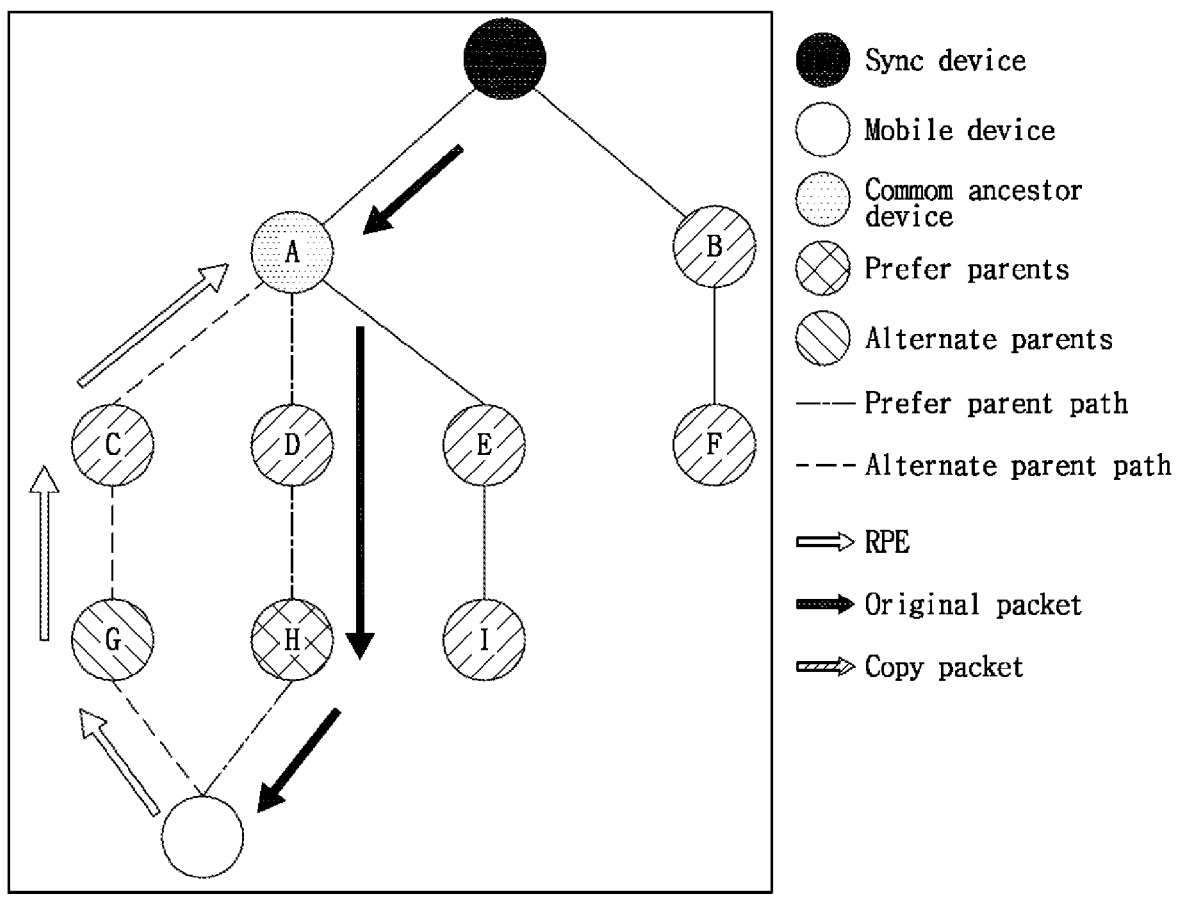
FIGS. 7 to 9 are diagrams illustrating a packet exchange procedure between a mobile device and a common ancestor device.
Figure 8:
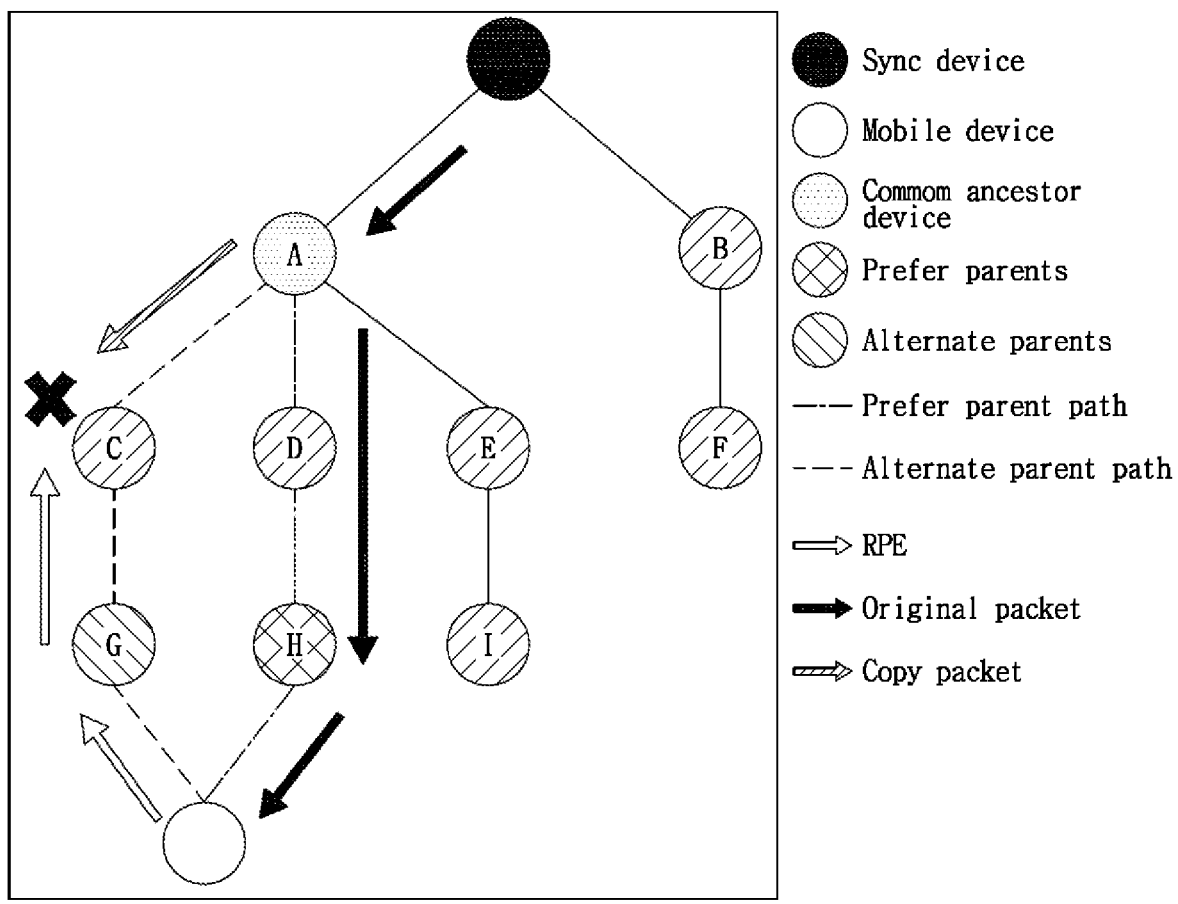
Figure 9:
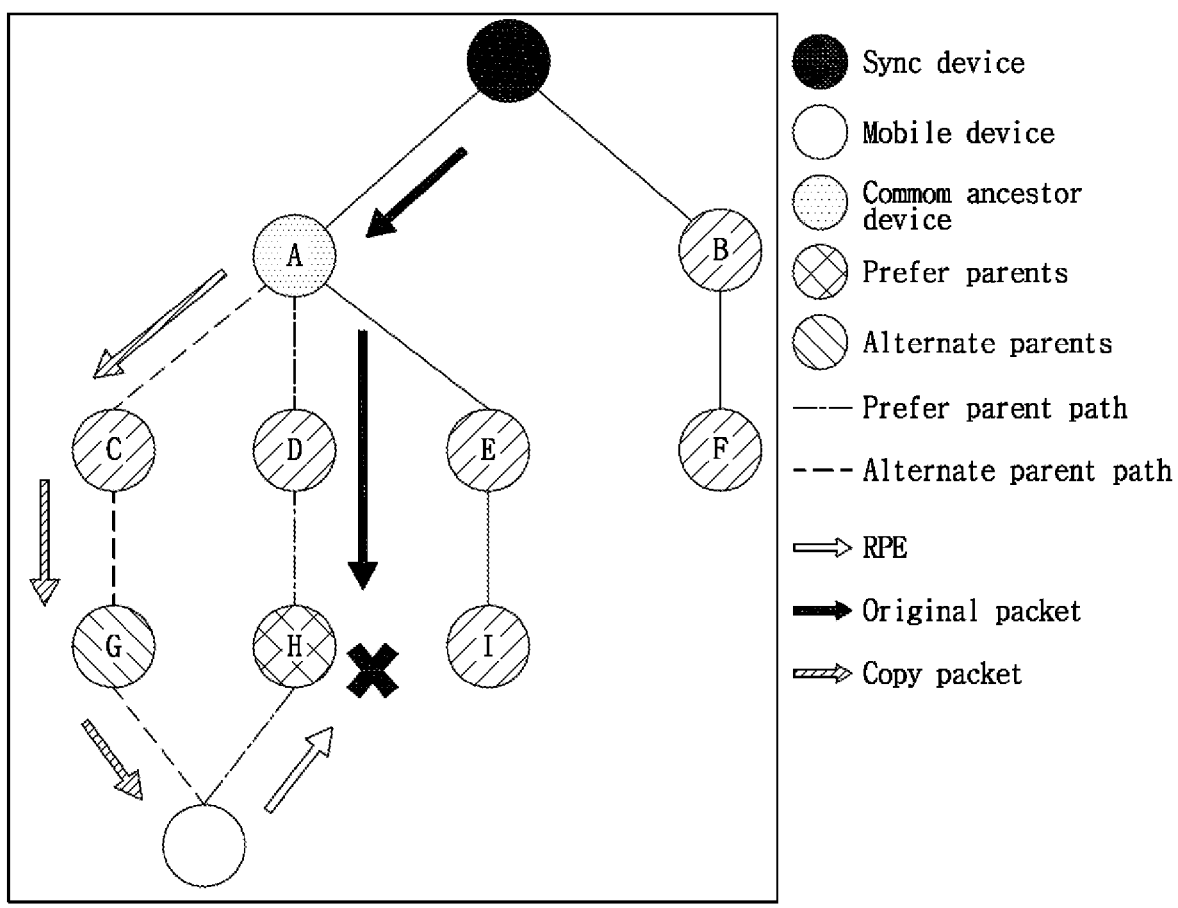

FIGS. 7 to 9 are diagrams illustrating a packet exchange procedure between a mobile device and a common ancestor device.

Packets transmitted from the sync device to the mobile device essentially pass through a common ancestor device.

The common ancestor device copies the packet and then sends an original packet to a prefer parent path. When an RPE cancellation packet is not received from the mobile device within a specified delay time, the common ancestor device transmits a copy packet to an alternate parent device path.

Upon receiving the packet, the mobile device transmits the RPE cancellation packet to the common ancestor device.

In this case, the mobile device uses a path other than a path in which the packet is received as a use path.

The device, having received the RPE cancellation packet determines whether there is a copy packet or an original packet corresponding to the RPE cancellation packet. If there is a copy packet or an original packet corresponding to the RPE cancellation packet, the device deletes the packet, and the RPE cancellation packet is no longer transmitted.

If there is no copy packet or original packet corresponding to the RPE cancellation packet, the RPE cancellation packet arrives at the common ancestor device. When the RPE cancellation packet is transmitted to the common ancestor device, a non-transmitted copy packet in the common ancestor device is deleted because the copy packet is not transmitted due to a delay time.

FIG. 7 illustrates a scenario in which a copy packet is not transmitted from a common ancestor device due to a delay time.

The delay time is determined based on a hop distance of the common ancestor device and the mobile device, and may be set differently according to the purpose of the application.

FIG. 8 illustrates a scenario in which a copy packet is transmitted before a common ancestor device receives an RPE cancellation packet transmitted by a mobile device.

FIG. 9 illustrates a scenario in which a copy packet is first transmitted to a mobile device due to a bad prefer parent path.

A change of prefer parents or alternate parents with the mobile device will be described in detail as follows.

Figure 10:
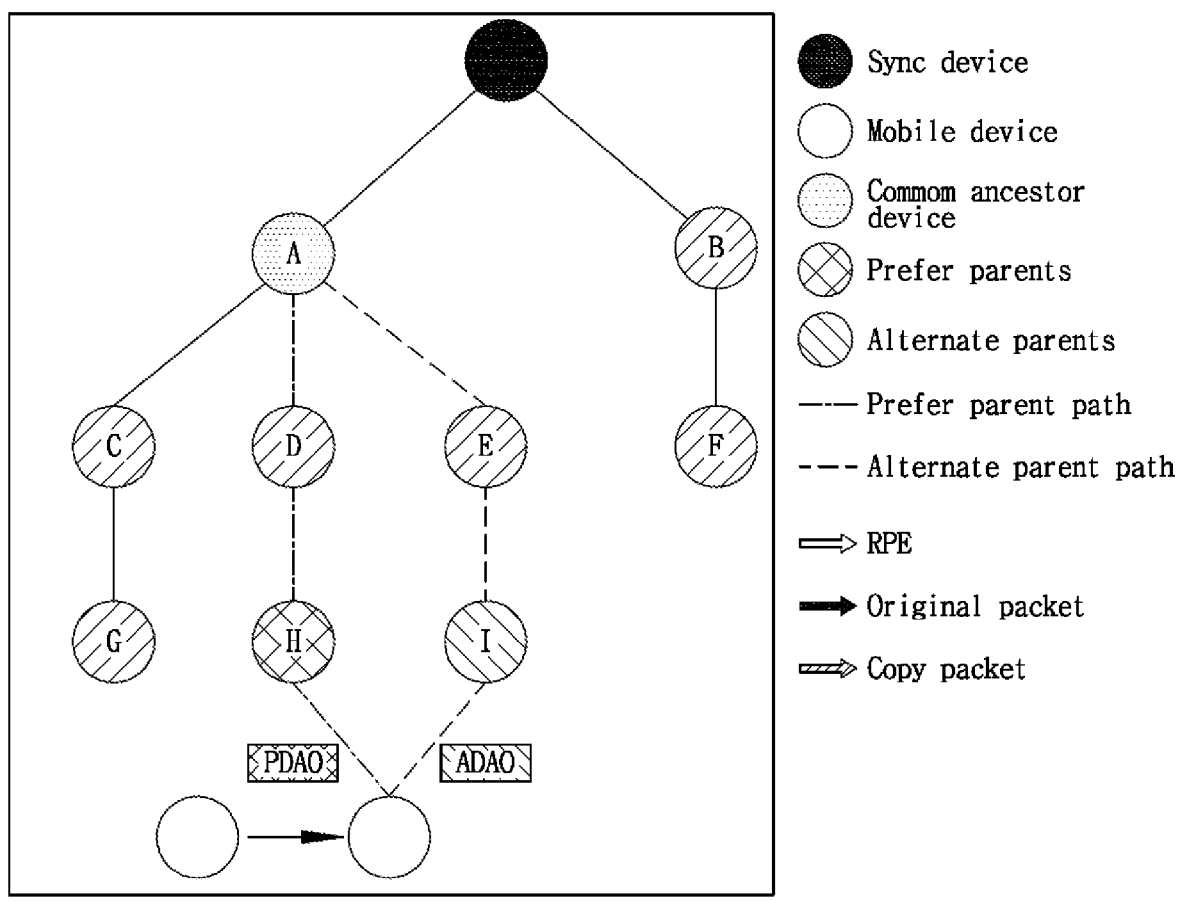
FIGS. 10 to 12 are diagrams illustrating a procedure for changing prefer parents or alternate parents with a mobile device.
Figure 11:
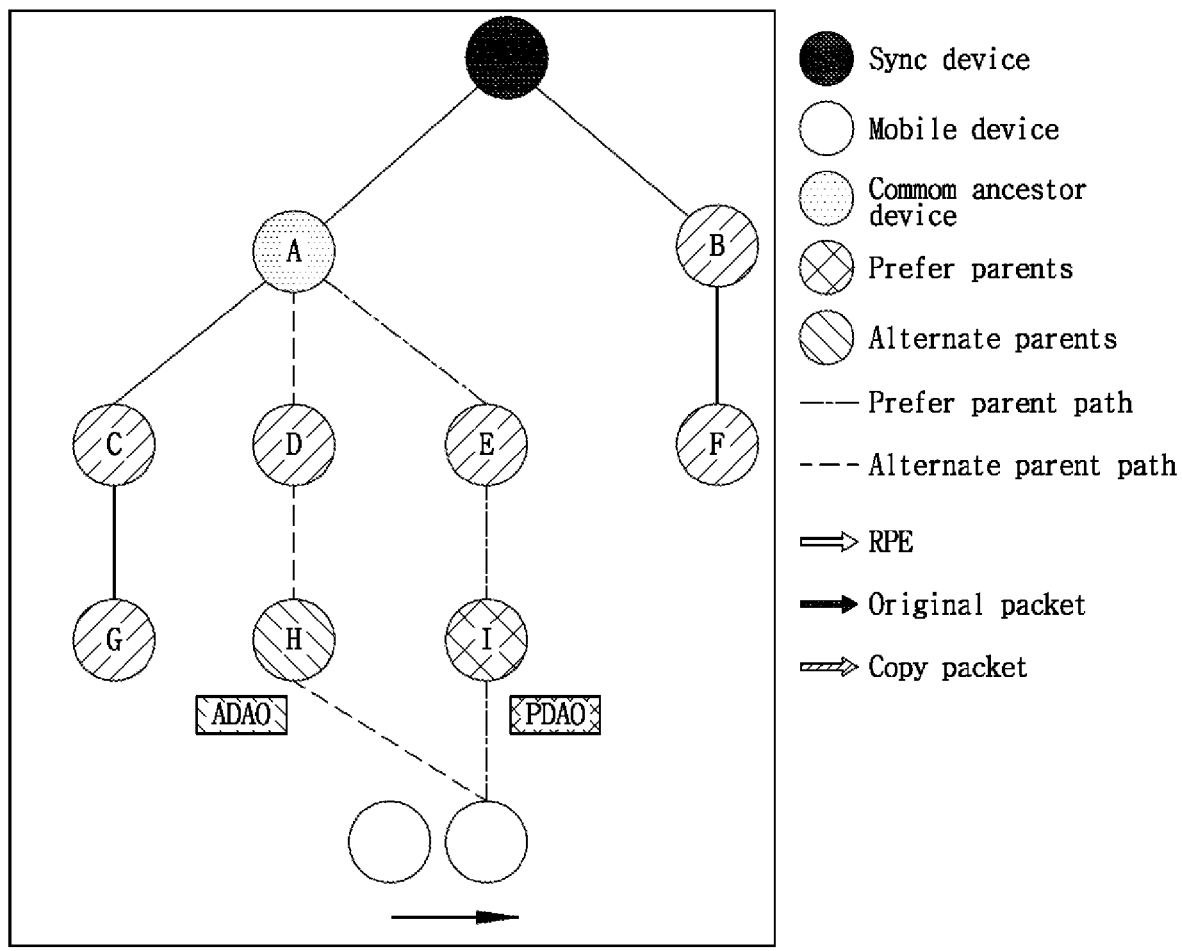
Figure 12:
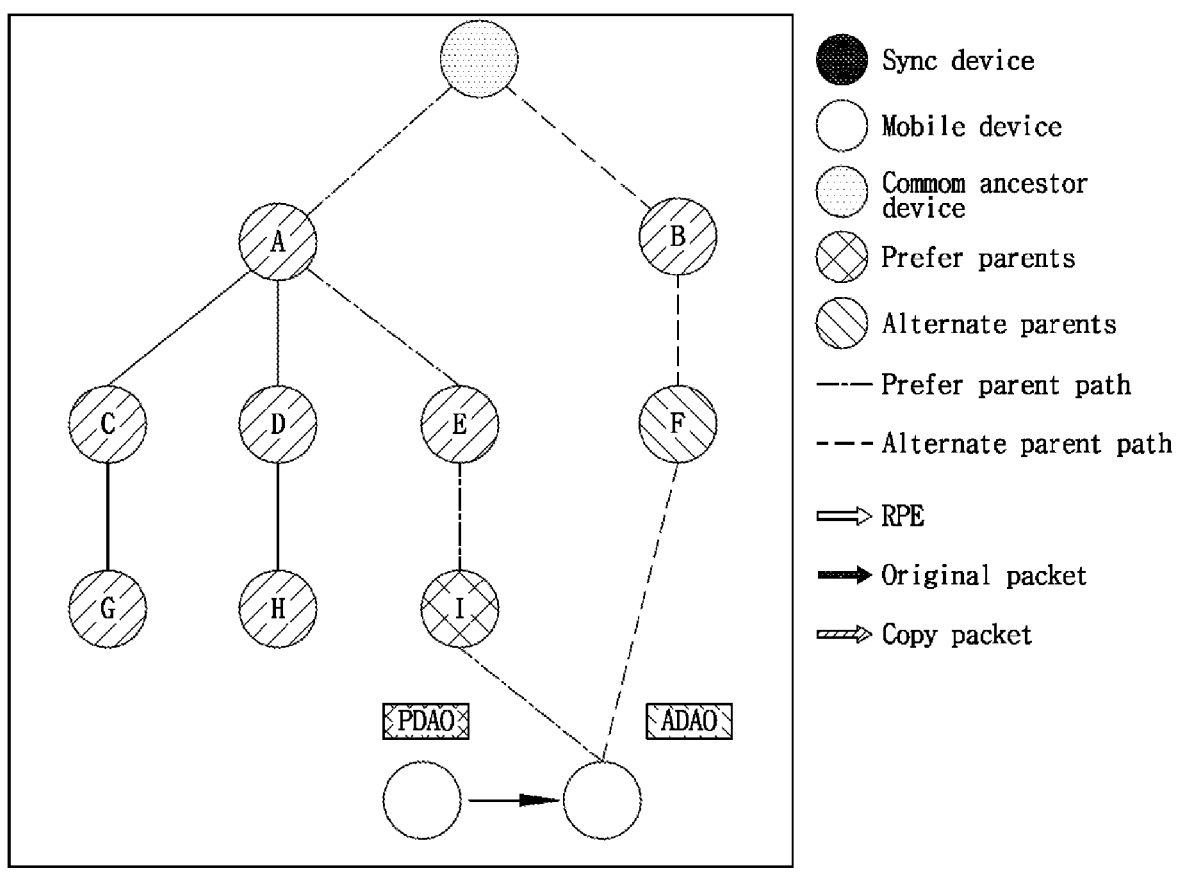

FIGS. 10 to 12 are diagrams illustrating a procedure for changing prefer parents or alternate parents with a mobile device.

When receiving a lower DAG rank than that of current alternate parents, the mobile device attempts to change the alternate parents.

The mobile device transmits a PDAO through a prefer parent path and transmits an ADAO through an alternate parent path to be changed. The device that received a pair of PDAO and ADAO in common becomes a new common ancestor device, and the existing common ancestor device is disqualified.

The newly established common ancestor device sends CCC to the mobile device to notify the mobile device that the setting is complete.

FIG. 10 illustrates a scenario for setting new alternate parents according to a movement of a mobile device. Because a DAG rank of a device I is lower than that of a device G, a change of the alternate parents is attempted.

The mobile device attempts to change the role of the prefer parents and the alternate parents when a DAG rank of the alternate parents is lower than that of a current prefer parents.

By transmitting an ADAO to the prefer parent path and a PDAO to the alternate parent path, the mobile device changes roles of the two parents. As in the above process, a device that receives a pair of PDAO and ADAO in common becomes a new common ancestor device, and the existing common ancestor device is disqualified.

FIG. 11 illustrates a new prefer parent setting scenario according to a movement of the mobile device. Because a DAG rank of a device I is lower than a DAG rank of a device H, a change of the prefer parents and the alternate parents is attempted.

The sync device may also be a common ancestor device.

FIG. 12 illustrates a scenario in which a common ancestor device is changed according to a movement of the mobile device.

The above-described device and method for increasing reliability of downlink traffic to mobile devices in an RPL environment according to the present disclosure enable to transmit packets through the remaining paths, even if one path is not valid due to a change of parents of the mobile device by dual path generation and redundant packet retransmission for the mobile device, and enable to minimize network life shorting by minimizing the dual path by using a common ancestor device selection method when retransmitting redundant packets through the dual path.

As described above, it will be understood that the present disclosure is implemented in a modified form without departing from the essential characteristics of the present disclosure.

Therefore, the specified embodiments should be considered from a descriptive point of view rather than a limiting point of view, and the scope of the present disclosure is illustrated in the claims rather than the above description, and it should be interpreted that all differences within the scope equivalent thereto are included in the present disclosure.

DETAILED DESCRIPTION OF MAIN ELEMENTS

100: Mobile device 200: Parent device
10: DAG rank value acquisition unit 40: DAO signal reception unit
20: Parent device selection unit 50: DAO change transmission unit
30: DAO signal processing unit 60: Dual path setting notification unit

What is claimed is:

1. A device for increasing reliability of downlink traffic to a mobile device in a routing protocol for low-power and lossy network (RPL) environment, wherein the device comprises:
   a directed acyclic graph (DAG) rank value acquisition unit configured to receive a destination oriented directed acyclic graph information object (DIO) of parent devices to obtain a DAG rank value of each of the parent devices;
   a parent device selection unit configured to select prefer parents and alternate parents based on the DAG rank value of the parent devices; and
   a destination advertisement object (DAO) signal processing unit configured to transmit a DAO to a sync device when the prefer parents and the alternate parents are determined,
   wherein a stationary device that becomes the parent device comprises:
      a DAO signal receiving unit configured to enable to obtain a common ancestor device qualification when receiving a DAO signal from the mobile device and receive a same pair of prefer parents DAO (PDAO) and alternate parents DAO (ADAO);
      a DAO change transmission unit configured to obtain a common ancestor device qualification and prevent further acquisition of a common ancestral device qualification; and
      a dual path setting notification unit configured to transmit common ancient configuration complete (CCC) to the mobile device to stop attempting to generate a dual path, and
   wherein the DAO rank value acquisition unit, the parent device selection unit, the DAO signal processing unit, the DAO signal receiving unit, the DAO change transmission unit, and the dual path setting notification unit are each implemented via at least one processor.

2. The device of claim 1, wherein the parent device selection unit is further configured to select parents with a lowest DAG rank as prefer parents and parents with a second lowest DAG rank as alternate parents based on the DAG rank value of the parent devices.

3. The device of claim 1, wherein the DAO signal processing unit is further configured to transmit a PDAO to prefer parents and an ADAO to alternate parents.

4. The device of claim 1, wherein the DAO change transmission unit is further configured to obtain a common ancestor device qualification, change a later coming PDAO or ADAO to an existing DAO, and transmit the existing DAO to the sync device to prevent further acquisition of a common ancestor device qualification.

5. A method for increasing reliability of downlink traffic to a mobile device in a routing protocol for low-power and lossy network (RPL) environment, the method comprising:
   receiving, by the mobile device, a destination oriented directed acyclic graph information object (DIO) of parent devices and obtaining a directed acyclic graph (DAG) rank of each of the parent devices;
   selecting parents with a lowest DAG rank as prefer parents and parents with a second lowest DAG rank as alternate parents based on the DAG rank of the parent devices;
   transmitting, by the mobile device that determines prefer parents and alternate parents, a destination advertisement object (DAO) to a sync device to transmit a prefer parents DAO (PDAO) to the prefer parents and an alternate parents DAO (ADAO) to the alternate parents;
   storing, by the parent devices that have received a PDAO or ADAO, information, then continuing to transmit the information to the sync device, and obtaining a common ancestor device qualification that has received a same pair of PDAO and ADAO; and
   obtaining a common ancestral device qualification, changing a later coming PDAO or ADAO to an existing DAO, transmitting the existing DAO to the sync device to prevent further acquisition of a common ancestor device qualification.

6. The method of claim 5, wherein a DAO message may set a PDAO or ADAO by adding a dual path option, and express the same pair through a sequence number.

7. The method of claim 5, wherein DIO reception of the mobile device comprises:
   obtaining a DAG rank value of a neighboring node and determining whether there are prefer parents;
   determining, if there are prefer parents, whether there are alternate parents, and transmitting, if there is no alternate parents, a PDAO to the prefer parents and transmitting an ADAO to candidate alternate parents;
   determining, if there are alternate parents, whether a change of the alternate parents is necessary, transmitting, if the change of the alternate parents is necessary, a PDAO to the prefer parents and transmitting an ADAO to candidate alternate parents;
   determining, if the change of the alternate parents is unnecessary, whether a change of the prefer parents is necessary, transmitting, if the change of the prefer parents is necessary, a PDAO to candidate prefer parents, and transmitting an ADAO to candidate alternate parents; and
   retransmitting common ancient configuration complete (CCC) when CCC is not received for some time after PDAO transmission and ADAO transmission.

8. The method of claim 5, wherein PDAO and ADAO reception of a common ancestor device or a sync device comprises:
   determining, when a DAO is received, whether the DAO is a PDAO or ADAO, changing, if the DAO is not PDAO or ADAO, the PDAO or ADAO to an existing DAO, and transmitting the existing DAO to the sync device;

determining, if the DAO is not ADAO, whether there is an ADAO, and determining, if there is an ADAO, whether the DAO is a PDAO transmitted from a same mobile device;

determining, if the DAO is a PDAO transmitted from the same mobile device, whether the ADAO and the PDAO are the same pair, disqualifying, if the ADAO and the PDAO are not the same pair, a common ancestor device qualification, and storing the PDAO; and obtaining, if ADAO and PDAO are the same pair, a common ancestor qualification, storing the PDAO, transmitting CCC, and changing the PDAO to the DAO.

9. The method of claim 8, wherein the determining of whether the DAO is a PDAO or ADAO, and if the DAO is an ADAO comprises:

determining whether there is a PDAO, and determining, if there is a PDAO, whether the DAO is an ADAO transmitted from the same mobile device;

determining, if the DAO is an ADAO transmitted from the same mobile device, whether the ADAO and the PDAO are the same pair;

disqualifying, if the ADAO and the PDAO are not the same pair, a common ancestor device qualification, storing the ADAO, and transmitting the ADAO or the DAO to the sync device; and obtaining, if the ADAO and the PDAO are the same pair, a common ancestral device qualification, storing the ADAO, transmitting CCC, and changing the ADAO to the DAO.

10. The method of claim 5, wherein a packet exchange procedure between the mobile devices and the common ancestor device comprises:

essentially passing, by the packet transmitted from the sync device to the mobile device, through the common ancestor device, copying, by the common ancestor device, the packet, and transmitting an original packet to a prefer parent path;

transmitting, if a Reverse Packet Elimination (RPE) cancellation packet is not received from the mobile device within a specified delay time, a copy packet to an alternate parent device path;

transmitting, when the packet is received, by the mobile device, an RPE cancellation packet to a common ancestor device using a path other than a path received the packet; and determining, by the mobile device that has received the RPE cancellation packet, whether there is a copy packet or an original packet corresponding to the RPE cancellation packet, deleting, if there is a copy packet or an original packet corresponding to the RPE cancellation packet, the packet, and preventing further transmission of the RPE cancellation packet.

11. The method of claim 10, wherein if there is no copy packet or original packet, the RPE cancellation packet arrives at the common ancestor device, and when the RPE cancellation packet is transmitted to the common ancestor device, a non-transmitted copy packet in the common ancestor device is deleted because the copy packet was not transmitted due to a delay time.

* * * * *